UNITED STATES PATENT OFFICE.

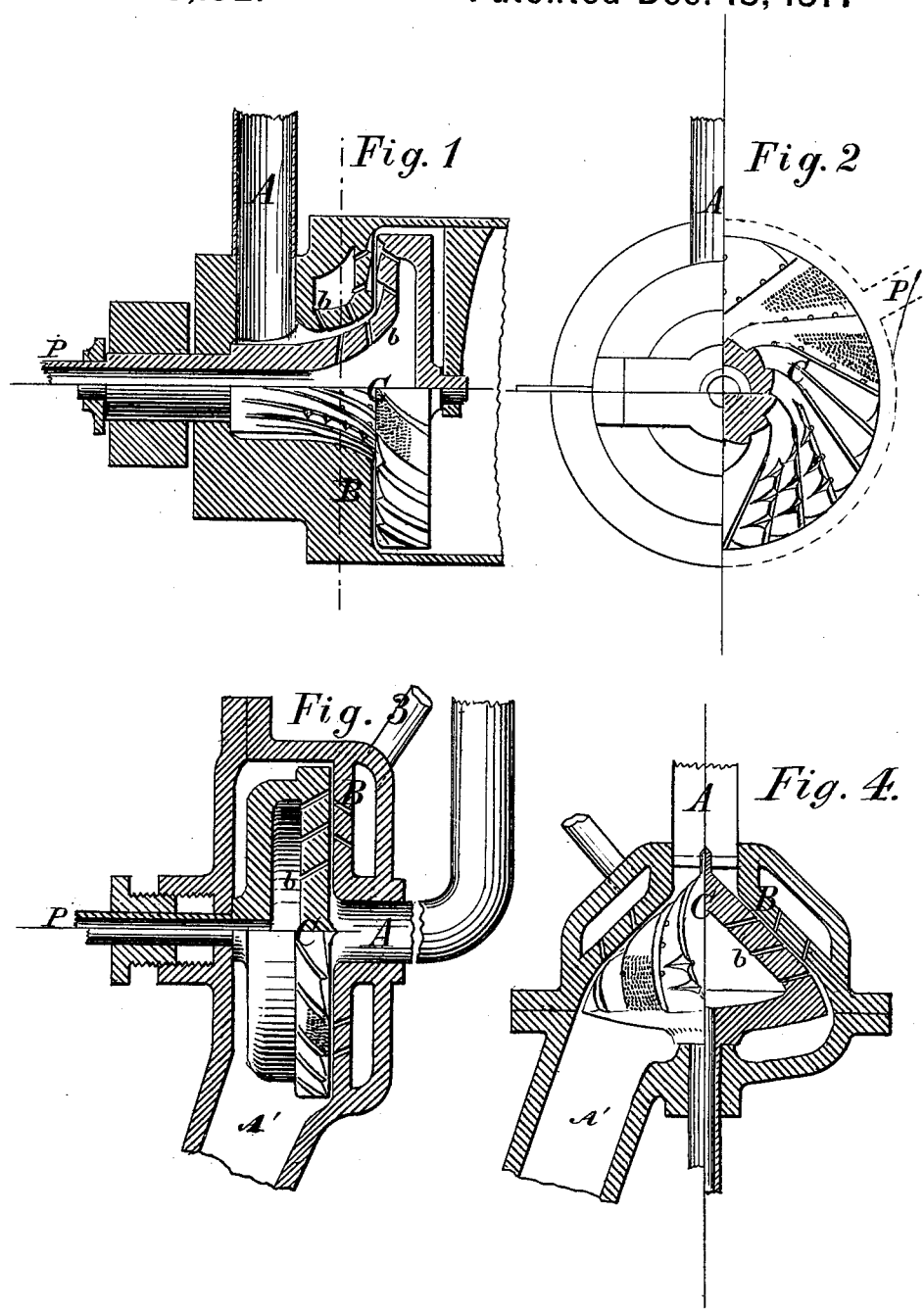

RUDOLPH D'HEUREUSE, OF NEW YORK, N. Y.

IMPROVEMENT IN PROCESSES AND APPARATUS FOR DISINTEGRATING CEREALS.

Specification forming part of Letters Patent No. 198,192, dated December 18, 1877; application filed December 26, 1876.

*To all whom it may concern:*

Be it known that I, RUDOLPH D'HEUREUSE, of New York city, in the county of New York and State of New York, have invented certain new and useful Improvements in Disintegrating Grains and Cereals; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention has a twofold object, the first of which is to reduce to a homogeneous mass the corn or other cereals or seeds that, under ordinary action of steam or of other pressure to which the substances have been subjected, had their farinaceous pulp but imperfectly disintegrated, or but partly broken up. The first part is accomplished by compelling the softened and roughly-disintegrated material, on leaving the disintegrator, to pass between the corrugated, toothed, or grooved faces of cylinders or disks, be the same plane, cone, or vary shaped, revolving close to the faces of a conformably-shaped, corrugated, toothed, or grooved mantle, (while in place of the corrugations, grooves, or teeth, or in addition thereto, brushes of elastic material may be employed,) and to assist the passage of the material, preventing it from filling the grooves by steam, compressed air, water, or other fluid admitted under pressure through holes in the grinding or rubbing faces. To accomplish the second part of the invention, the entire mass produced by action of steam or other pressure is again concentrated by drying.

It is important that, for brewing or other similar purposes to which mash from corn or other grain is employed, the material should be uniformly disintegrated and free from coherent lumps and unopened portions of the material, which is but partially accomplished by the ordinary modes of steaming these materials. An unduly long exposure to the action of the steam favors a tendency to injure the mass, and therefore it is frequently preferable to shorten the time of steaming. I propose to finish the still incomplete disintegration of the farinaceous parts by the mechanical means to be hereinafter described.

Reference being had to the drawings, in which like letters indicate like objects—

Figures 1 and 2 represent sectional views of a revolving disk, C, part plane and part conical, with grooved, toothed, and brush-lined faces, and provided with perforations for the steam, air, or fluid to keep the faces clean. The faces of the mantle B correspond with those of the disk, and are similarly grooved, toothed, or corrugated and perforated, as indicated. Figs. 3 and 4 represent devices of different shapes.

A is the discharge-pipe of the disintegrator or steaming apparatus, the contents of which, by the pressure therein, are forced out and made to pass between the grinding, rubbing, or brushing faces of C and B before they can enter the mash-tun or receiver. The cylinder, cone, or disk is intended to revolve at a speed of about two hundred revolutions per minute and upward.

Frequently it is not at all desirable to break up the hulls entirely, but to disintegrate as minutely as possible the farinaceous pulp of the material. I therefore propose to employ brushes of bristles, steel strips, or other elastic material, in place of or in addition to the corrugations, grooves, or teeth in the faces of the above-described devices. The brushes may form part of the otherwise grooved or toothed faces; for instance, groove and strip of brush may alternate, or either the revolving or the stationary faces alone may be brush-lined.

The holes by which the working faces of the grinders may be perforated will be arranged preferably at the bottom of the grooves or teeth, or between the brushes, and receive the steam, compressed air, or liquid under pressure from the rear of the grinding or rubbing faces, as indicated in the drawings by letters *b*, and conducting-pipe P. By these means the grooves and faces are kept free from clogging or adherent material, at the same time assisting the quick passage of the disintegrated substance.

The same device of revolving cylinders or disks, grooved or brush-lined, and perforated for steam, compressed air, or liquid, is of equal applicability for the disintegration of substances other than seeds or cereals.

To explain the second part of the invention, I shall describe the entire operation. The corn (or other cereals or seeds) is charged entire with water in a close tank, and subjected to the action of steam at a pressure of ten pounds per inch, which is about 238° Fahrenheit, and upward, or to heat and a pressure produced in any other manner than by steam; for instance, of compressed air, carbonic acid or other gases not injurious to the substance treated, or by admission of water or other aqueous liquid under hydrostatic, hydraulic, steam, or pneumatic pressure. Under such action, preferably under slow stirring, the corn becomes disintegrated, and after this has been accomplished to a sufficient extent the mass is discharged from the disintegrator, at which time, if so required, it may be subjected to the action of the grinding or brushing device hereinbefore described. The mass thus produced is then run through or into molds, to fashion it into suitable shapes; or after setting in boxes or other receptacles till firm, it is cut, sliced, or otherwise fashioned into the shapes it is intended to assume, and passed into drying-chambers. Issuing from these in a dried condition in the shape of cakes, sheets, strings, &c., it is left to remain in such shapes, or further broken up for convenient packing or further use.

The same description of the manipulations answers for materials other than corn, with such modifications as their nature and the purpose in view may require.

The article thus produced retains all the constituents of the original material, and is quickly prepared for the various uses to which the latter are ordinarily turned by briefly soaking, and without any of the expensive operations or appurtenances otherwise required. Retaining also the hulls, it is for some purposes better qualified than that prepared by the process described in the patent of Julius d'Heureuse of April 25, 1876, in which the mass is freed from the hulls before drying, and by the omission of this operation to remove the hulls expense is saved.

I do not claim the use of a grinding device to disintegrate the steamed vegetable matter within the steaming apparatus, or after it has been discharged therefrom into a mash-tun or receiver; nor do I employ for the operation of grinding a steam-incased device.

I am aware that it is not new to cook grain until the same is softened, and then when in that condition to crush or break the grain, and therefore I do not claim the same; but

What I claim is—

1. The within-described process of disintegrating grain and cereals, consisting in subjecting the material to the action of heat and water or steam in a close vessel, preferably under pressure, until the same is reduced to a pulpy or pasty consistency, and thereupon, before the mass is injured by the steam, removing it from the tank and further disintegrating it until freed of coherent lumps by passing it between two grinding or rubbing surfaces, substantially as set forth.

2. The mantle B, provided with a channel having an orifice or orifices for the passage of gas, steam, or liquid, and having projections on its face, in combination with a conformably-shaped and similarly-constructed disk, cone, or cylinder, C, and with admission and outlet pipes A A', substantially as set forth.

3. The mantle B, provided with a channel having an orifice or orifices for the passage of gas, steam, or liquid, and having projections on its face, in combination with a conformably-shaped disk, cone, or cylinder, C, having projections or brushes on its face, and with spouts A A', substantially as set forth.

4. The mantle B, provided with a channel having an orifice or orifices for the passage of gas, steam, or liquid, in combination with a conformably-shaped disk, cone, or cylinder, C, having brushes on its face, and with spouts A A', substantially as set forth.

In testimony that I claim the foregoing as my own I affix my signature in presence of two witnesses.

RUDOLPH D'HEUREUSE.

Witnesses:
 DANIEL R. GARDEN,
 FRANK S. MIDDLEBROOK.